United States Patent [19]

Hosokawa et al.

[11] Patent Number: 5,150,262
[45] Date of Patent: Sep. 22, 1992

[54] RECORDING METHOD IN WHICH RECORDING SIGNALS ARE ALLOCATED INTO A PLURALITY OF DATA TRACKS

[75] Inventors: Nobuo Hosokawa, Ikeda; Shigekazu Togashi, Katano, both of Japan

[73] Assignee: Matsushita Electric Industrial Co., Ltd., Osaka, Japan

[21] Appl. No.: 476,496

[22] Filed: Jun. 11, 1990

[30] Foreign Application Priority Data

Oct. 13, 1988 [JP] Japan .................................. 63-257578

[51] Int. Cl.$^5$ .............................................. G11B 5/09
[52] U.S. Cl. .................................................. 360/48
[58] Field of Search ........................... 360/48, 53, 22

[56] References Cited

U.S. PATENT DOCUMENTS

| | | | |
|---|---|---|---|
| 4,685,004 | 8/1987 | Takahashi et al. | 360/48 |
| 4,809,097 | 2/1989 | Fujii et al. | 360/22 |
| 4,887,169 | 12/1989 | Bannai et al. | 360/22 |
| 5,012,459 | 4/1991 | Odaka et al. | 360/32 |

FOREIGN PATENT DOCUMENTS 0029454 2/1986 Japan .

Primary Examiner—David J. Severin
Attorney, Agent, or Firm—Wenderoth, Lind & Ponack

[57] ABSTRACT

A method of recording including the steps of dividing data of each of a group of frames including video signals and a group of channels of audio signals into a group of divided data independent from other data to be recorded on a recording medium and dividing each of a group of tracks provided on the recording medium into a group of sectors along the longitudinal direction thereof onto which the divided data are separately and optionally recorded so as to be subsequently changed by other divided data during the editing of data and recording the divided data onto the sectors such that each of the divided data relating to the same kind of source signals is arranged in succession within at least more than two of the sectors of tracks which are positioned adjacent to each other in the direction of moving the recording medium so as to form an editing data until consisting of the same kind of source signals which is adapted to be scanned by at least more than two heads at the same time during the editing of data.

2 Claims, 10 Drawing Sheets

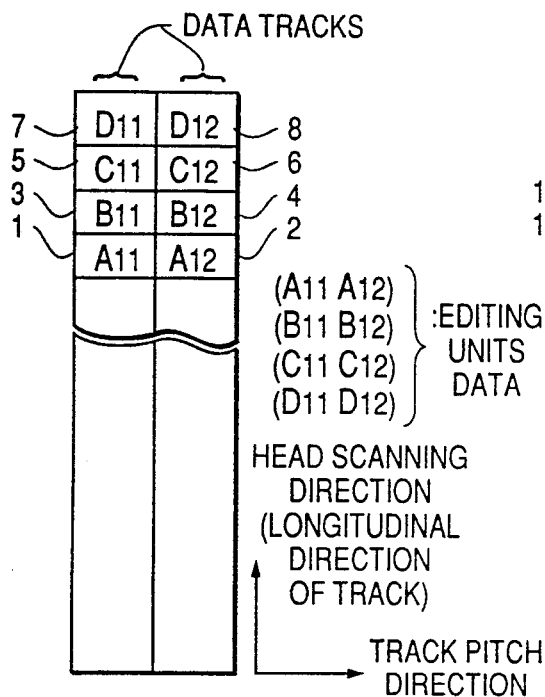
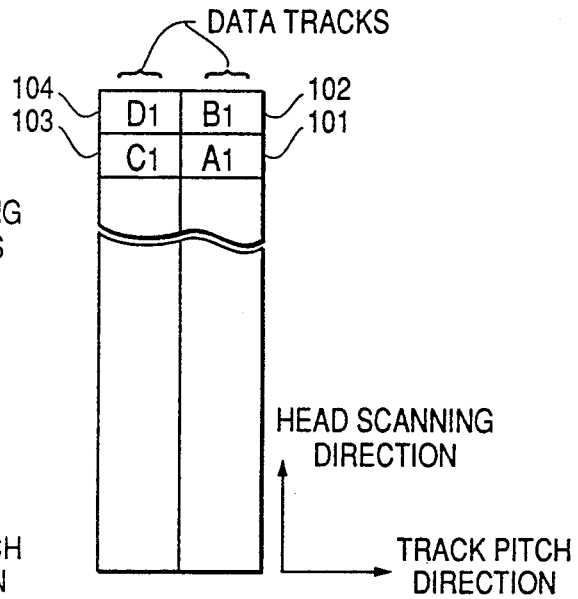
FIG. 1
FIG. 10 PRIOR ART
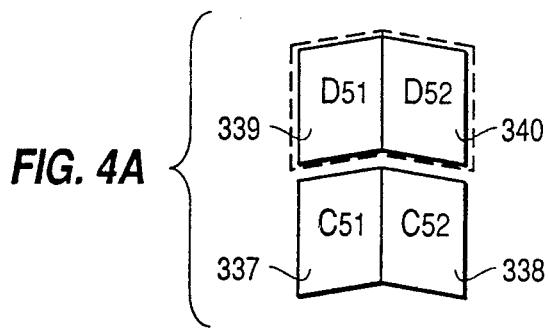
FIG. 4A
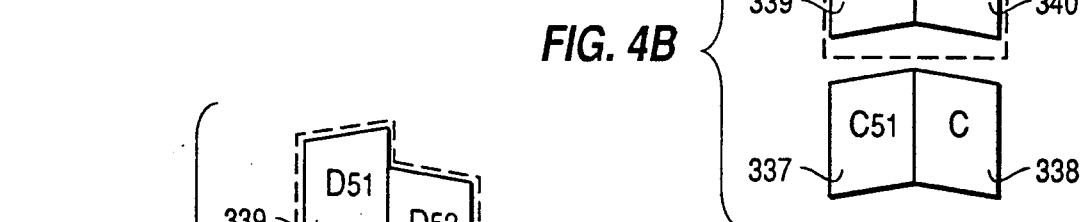
FIG. 4B
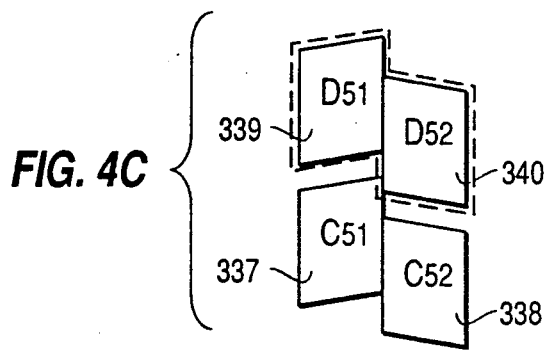
FIG. 4C

RECORDING METHOD IN WHICH RECORDING SIGNALS ARE ALLOCATED INTO A PLURALITY OF DATA TRACKS

BACKGROUND OF THE INVENTION

1. Field of the Invention

The present invention relates, in a record reproducing apparatus for video, cassette, recorder or the like, to a method of allocating the recording signals (for example, audio signals and video signals) into a plurality of data tracks composed of a plurality of editing unit data so as to record them.

2. Description of the Prior Art

Conventionally, in a record reproducing apparatus, a recording method generally allocates the recording signals into a plurality of data tracks so as to effect the recording operation on a recording medium; the recording signals (for example, audio signals and video signals) are composed of a plurality of editing unit data. (For example, Richard brush; Design Consideration for the D - 2 NTSC Composite DVTR : SMPTE Journal: 182-193, March, 1988).

Here the data in one editing unit of the recording signal is defined to be the data in the least unit capable of rewriting in the recording of the new signals on the prerecorded part on the recording medium by a certain record reproducing apparatus. For example, assume that the recording signals are video signals, and the data in the editing unit become the data of the video signals of one field or one frame. Conventionally, a recording method is provided for allocating the data of a certain one editing unit as is on one data track on the recording medium without dividing the data in a certain one edition unit into a plurality of units so as to effect the recording operation.

The conventional recording method will be described hereinafter.

FIG. 10 is a format chart on the recording medium in the conventional recording method. Here, a recording method of allocating four editing units of data (the audio signals of four channels) into two data tracks is simply described, with the format of the other portions not being mentioned.

As shown in FIG. 10, the data (audio signals of four channels) "A1", "B1", "C1", "D1" of four editing units are allocated to the portions of 101, 102, 103, 104 of two data tracks. Namely, the data (the audio signal of one channel) of one editing unit is allocated to one data track without being divided.

The data of the editing unit in the other data tracks which are not shown in FIG. 10 are allocated onto the recording medium and recorded by a similar method.

But in the record reproducing apparatus adopting a recording method of allocating the recording signals composed of a plurality of editing unit data into a plurality of data tracks so as to record them, it is necessary to effect the tracing operation again with the head so as to renew (write one over another) only the portion on the recording medium to which the recording signal of a particular editing unit data is allocated when only a particular editing unit data is edited from a plurality of editing unit data of the recording signals.

But in the conventional recording method, as the data of one editing unit is allocated as is to one data track without being divided, the linearity of the track may often be shifted due to the mechanical accuracy problem, and is shifted especially during interchangeable reproduction (that is, the apparatus which has recorded the signals is different from the apparatus used to reproduce such signals). As a result, in the editing point, the interference of the overlapped writing and the erasure remanants occur on both sides of one track, with a problem that the reproducing signals are considerably deteriorated.

The reason will be described in detail hereinafter.

FIGS. 11A–11C are model chart showing how the reproduction signals are deteriorated at the editing point when the linearity of the track has been shifted. FIG. 11 A shows a record pattern chart with the audio signals of four channels being recorded in the time series in accordance with the format shown in FIG. 10. FIG. 11B is a record pattern chart in a case where the linearity of the track has been shifted by X1 in the track pitch direction in comparison with the record pattern shown in FIG. 11A, with the insertion edition to the editing point (editing unit data "A2") about the editing unit data "A1" through "A4" of the audio signal of one channel of the audio signals of four channels shown in FIG. 11A. FIG. 11C is a record pattern chart with the linearity of the track being shifted by X2 in an inverse direction to the record pattern shown in FIG. 11B as compared with the record pattern of FIG. 11A, with the connecting record being performed from the editing unit data "A3" about the record pattern recorded as in FIG. 11B.

In FIG. 11 C, when the shift (X1) of the track shown in FIG. 11B in the audio signal of one channel is opposite in direction in the shift (X2) direction of the track shown in FIG. 11C the majority of the editing unit data "C3" disappears due to the overlapped writing of the editing unit data "A2", "A3", thus deteriorating the reproduction signal of the editing unit data "C3" in the data track where the editing unit data "C3" has been allocated as shown in (1) portion. Likewise, even in the track where the editing unit data "A3" is allocated, the data "A3" of the prerecorded portion remains partially as the unerased remains, so that the reproduced signals of the newly recorded data "A3" (the portion of hatching) are deteriorated.

SUMMARY OF THE INVENTION

An object of the present invention is to provide a recording method of reducing the deterioration of the reproduction signals at the editing point as compared with the conventional recording method even when the editing operation is effected with the track being shifted from the already recorded track pattern because of the track linearity shift, the head height shifting by the mechanical precision problems, further tracking shifting during the reproducing operation, and so on.

In order to achieve the above object, in allocating the record signals composed of the data of an edition unit into a plurality of data tracks, the data of at least one unit, which can be rewritten so as to record them on the recording medium, the recording method of the present invention comprises dividing the data of the respective editing units of the recording signals into N data units (N is an integer of two or more) with the individual portions divided being provided as partial data tracks, and allocating the respective divided data into the N partial data tracks disposed among the data tracks so as to effect the recording operation on the recording medium, with all the data tracks being divided into a plurality of tracks, the individual divided portions being provided as the partial data tracks.

BRIEF DESCRIPTION OF THE DRAWINGS

FIG. 1 is a format chart on the recording medium for the illustration of the recording method in accordance with a first embodiment of the present invention;

FIGS. 4A through 4C are enlarged views with the circle interior of the (1) portion being enlarged;

FIG. 10 is a format chart on the recording medium in the conventional recording method;

DESCRIPTION OF THE PREFERRED EMBODIMENT

The recording method in the embodiment of the present invention will be described hereinafter with reference to the drawings.

FIG. 1 is a format chart on the recording medium recorded by the recoding method in accordance with the first embodiment of the present invention.

Here, a case wherein one editing unit is supposed to be, for example, N=2 in the dividing operation of one editing unit into an N number (N is an integer of two or more) will be described.

In the present embodiment, assume that the data of the "A1" through "D1" of four editing units are recorded, and the data "A1" through "D1" of the editing units are respectively divided into two (N=2) of the "A11, A12" through "D11, D12", the respective data of the divided are allocated to the portions of two partial data tracks "1" through "8" adjacent among the data tracks and are recorded on the recording medium. At this time, the region where the data of one editing unit is occupied in the recording medium is distributed narrowly in the head scanning direction and widely in the track pitch direction as compared with the conventional example. Also, the data of the editing unit in the other data track which are not shown in FIG. 1 is also allocated and recorded on the recording medium in the similar method.

Figure 2A:
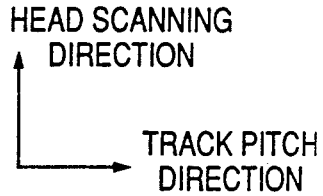
FIG. 2A through 2C are module charts showing how the reproduction signals are deteriorated at the editing points to be caused when the linearity of the track has been shifted during interchangeable reproduction by the recording method in accordance with the first embodiment of the present invention.
Figure 2B:
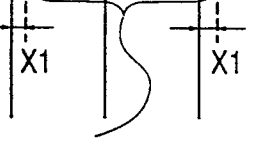
Figure 2C:
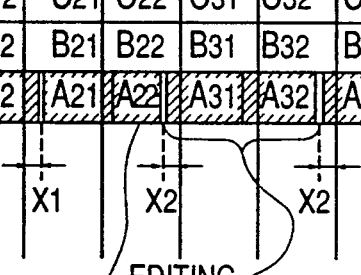

FIGS. 2A through 2C are model charts showing the deterioration of the reproduction signals at the editing point to be caused in a case when the linearity of the track has been shifted in the the interchangeable reproduction by the recording method in accordance with the first embodiment of the present invention. The same drawing A shows the record pattern chart recorded in accordance with the recording method in accordance with the first embodiment of the present invention, the inserting edition is effected up to the editing points ("A21, A22") about the "A11, A12", "A21, A22" through "A41, A42" within a plurality of editing unit data "A11, A12", "A21, A22" through "A41, A42", "B11, B12", "B21, B22" through "B41, B42", "C11, C12", "C21, C22" through "C41, C42", "D11, D12", "D21, D22" through "D41, d42" shown in the same drawing A; the same drawing B shows the recording pattern when the linearity of the track has been shifted by X1 in the track pitch direction through the comparison with the recording pattern shown in the same drawing A.

The same drawing C is a record pattern chart when the linearity of the track has been inversely shifted by X2 to the record pattern shown in the same drawing B through comparison with the record pattern of the same drawing A, with the connection record being effected after the editing point in the record pattern recorded like the same drawing B, namely, in the "A31, A32" and "A41, A42".

In FIG. 2 C, since a portion of the editing unit data "A22" disappears due to the overlapped writing due to the shift (X1) of the track shown in the same drawing B and the shift (X2) of the track shown in the same drawing C as shown in the (1) portion, the reproduction signal of the editing unit data "A22" is deteriorated.

Figure 11A:
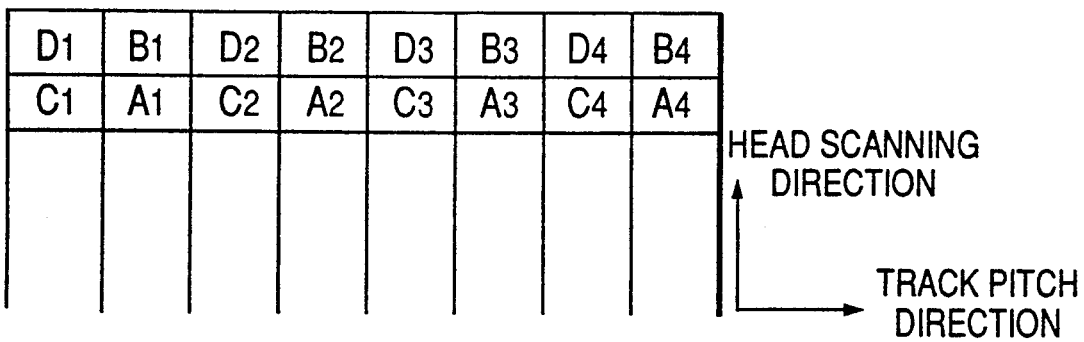
FIGS. 11A through 11C are model charts showing how the reproduction signals are deteriorated at the edition points when the shifted linearity of the track has been shifted during interchangeable reproduction by the format shown in FIG. 10.
Figure 11B:
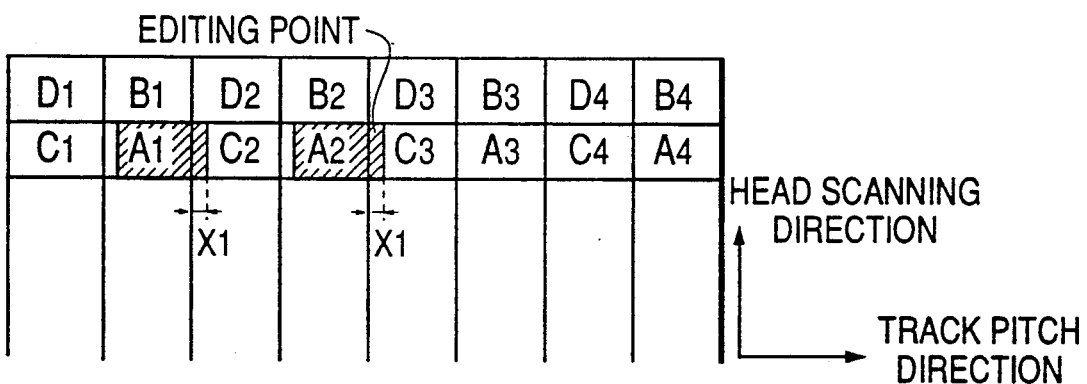
Figure 11C:
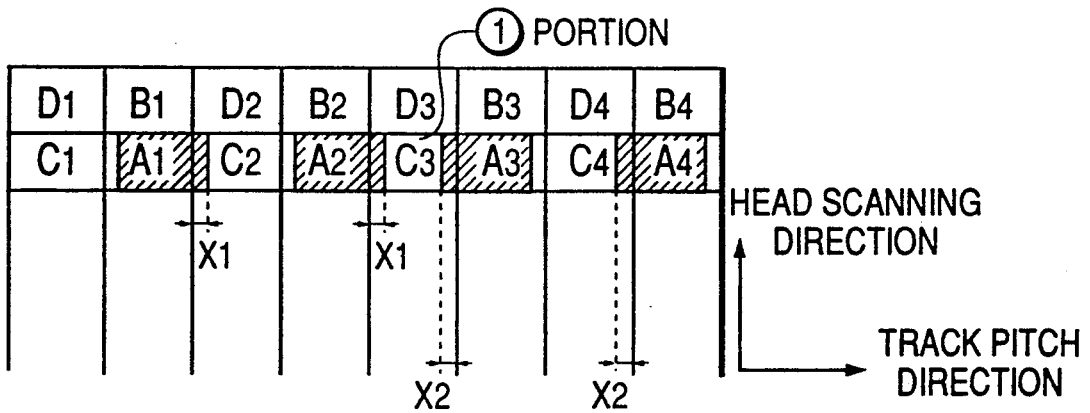

Here, through the comparison of the deterioration degree of the reproduction signal between a recording method in the first embodiment of the present invention by the format shown in FIG. 1 and the conventional recording method by the format shown in FIG. 10, in the comparison at one editing unit as clear from the data "C3" which is the (1) portion of FIG. 11C, and the "A22"+"A21" which is the (1) portion of FIG. 2 C, it is found out that in the first embodiment of the present invention, the disappearance of the data due to the overlapped writing is less, and the degree of the deterioration of the reproduction signal is more improved than in the conventional embodiment.

Namely, since the data of one editing unit is divided into two, and are allocated into two adjacent partial data tracks adjacent between the data tracks, and are recorded, the divided editing unit data are necessarily recorded and reproduced by the recording and reproducing apparatus having the same editing unit data, so that there is no possibility of receiving the interferences of the overlapped writing and the unerased remains between two adjacent data tracks (for example, between the division data "A11, A12" in FIG. 2C) with on editing unit of data being divided and being allocated thereinto.

Meanwhile, since the region occupied by one editing unit data is distributed so as to be narrow in the head scanning direction and wide in the track pitch direction as compared with the conventional arrangement, the region to be affected upon deterioration of the track linearity during exchanging reproduction is consequently reduced.

Figure 3:
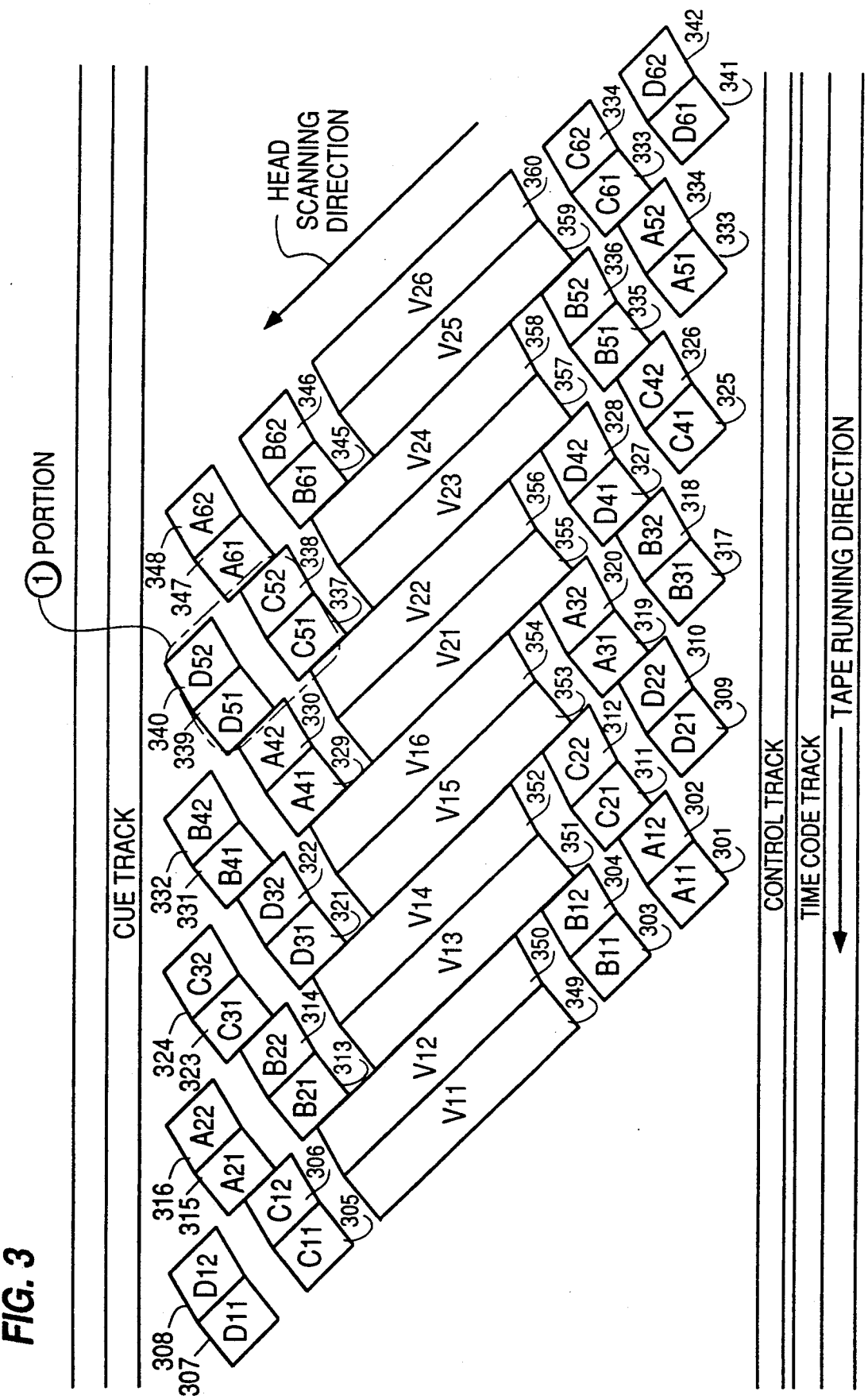
FIG. 3 is a format chart on the recording medium for illustration of the recording method in accordance with a second embodiment of the present invention.

FIG. 3 is a format on the recording medium recorded by the recording method in accordance with the second embodiment of the present invention.

In the second embodiment, the audio signals of four channels which are, for example, M=4, and the video signals are to be recorded as the audio signals of the M channel (M is a positive integer), and are allocated to five (M=4: M+1=5) partial data tracks. The data (not shown) of the editing unit of the audio signals of four channels and the video signals are inputted as the "A1", "A2" through "A6", the "B1", the "B2" through "B6", the "C1", the "C2" through "C6", the "D1", "D2" through "D6", the "V1", "V2" respectively in the time series order, and are to be recorded after having been divided. As in the first embodiment, the data of the editing unit of the audio signal of four channels are respectively divided into two of "A11, A12", the "A21, A22" through "A61, A62", the "B11, B12", the "B21, B22" through the "B61, B62", the "C11, C12", the "C21, C22" through "C61, C62", the "D11, D12", the "D21. D22" through "D61, D62" as in the first embodiment, also, the editing unit data "V1", "V2" of the video signal are divided respectively into six of the "V11, through V16", the "V21, through V26". In FIG. 3, each data of the audio signals of four channels are allocated, recorded onto the pairs (301, 302), (315, 316), (319, 320), (329, 330), (333, 324), (347, 348), and (303, 304), (313, 314), (317, 318), (331, 332), (335, 336), (345, 346), and (305, 306), (311, 312), (323, 324), (325, 326), (337, 338), (343, 344), and (307),308), (309, 310), (321, 322), (327, 328), (339, 340), (341, 342) of the adjacent two partial data tracks between the data tracks, and each data of the video signals are allocated, recorded onto the adjacent six partial data tracks (349 through 354) and (355 through 360) among the data tracks.

Also, the example of the portion with the circle interior of the (1) portion of FIG. 3 being enlarged is shown in FIGS. 4A-4C. In FIGS. 4A through 4C, there are shown patterns as to the way of arranging the partial data tracks 339, 340 with the data "D51", "D52" with the data "D5" of one editing unit being divided being allocated thereto. In the region shown with broken lines in the same drawing A through C here, there is included only the data of one editing unit (in the same drawing, the editing unit data "D5"). As shown in the same drawing A through C, there are many patterns as to the way of arranging the partial data tracks with one editing unit of data being divided, allocated thereto, in which the data "D51", "D52" are completely adjacent as shown in, for example, the same drawing A, B, and the data "D51", "D52" are somewhat shifted in the longitudinal direction of the track as shown in the same drawing C. But when the tracking shift has been caused in the editing operation of the data "C51", the influences of the tracking shifts are applied on the data "C52" adjacent to the data "C51", and the overlapped writing is effected on the data "D52" in such a pattern a shown in the same drawing C, so that the influences of the tracking shifts are caused more as compared with the case of the same drawing A, B.

Also, as shown in FIG. 3, although the present embodiment has, for example, one editing unit data "C5" divided into two, "C51", "C52" arranged in parallel contact into two tracks in the approximately vertical direction with respect to the head scanning direction, namely, the track pitch direction, the data "C5" may be divided into three as in the "C51", "C52", "C53" (not shown) and be brought into parallel contact with the three tracks. In this case, the length of the head scanning direction of each division data may be made shorter as compared with the case of the two divisions, also the length of the track pitch direction becomes longer as compared with the two divisions, so that the deterioration of the reproduction signals caused by the track shift is reduced. Namely, as the number of the divisions becomes larger, the deterioration of the reproduction signals may be reduced.

And in the present embodiment, although the data with the data of the editing unit of each signal being divided is allocated, recorded in the order of the audio signals of two channels, the video signal, the audio signals of two channels onto the five partial data tracks per data track with one data track being provided as the partial data track divided into five in the longitudinal direction of the track, the order in which the respective signals are allocated is not restricted to it, so that the data of the editing unit of each signal may be divided, recorded so that the audio signals of four channels may be arranged continuously on the data track in the order of, for example, the audio signals of four channels, the video signal without the division into the respective two channels with the video signal being provided between the audio signal of four channels to effect the recording. Also, in this case, it is needless to say that the recording operation may be effected in the order of the video signal, and the audio signals of four channels.

Further, the video signal to be allocated originally into the one data track with one data track being provided as six partial data tracks is divided into two so as to divide the data of the editing unit of each signal in the order of the video signal, the audio signal of four channels, and the video signal so that they may be allocated, recorded onto six partial data tracks.

Figure 5A:
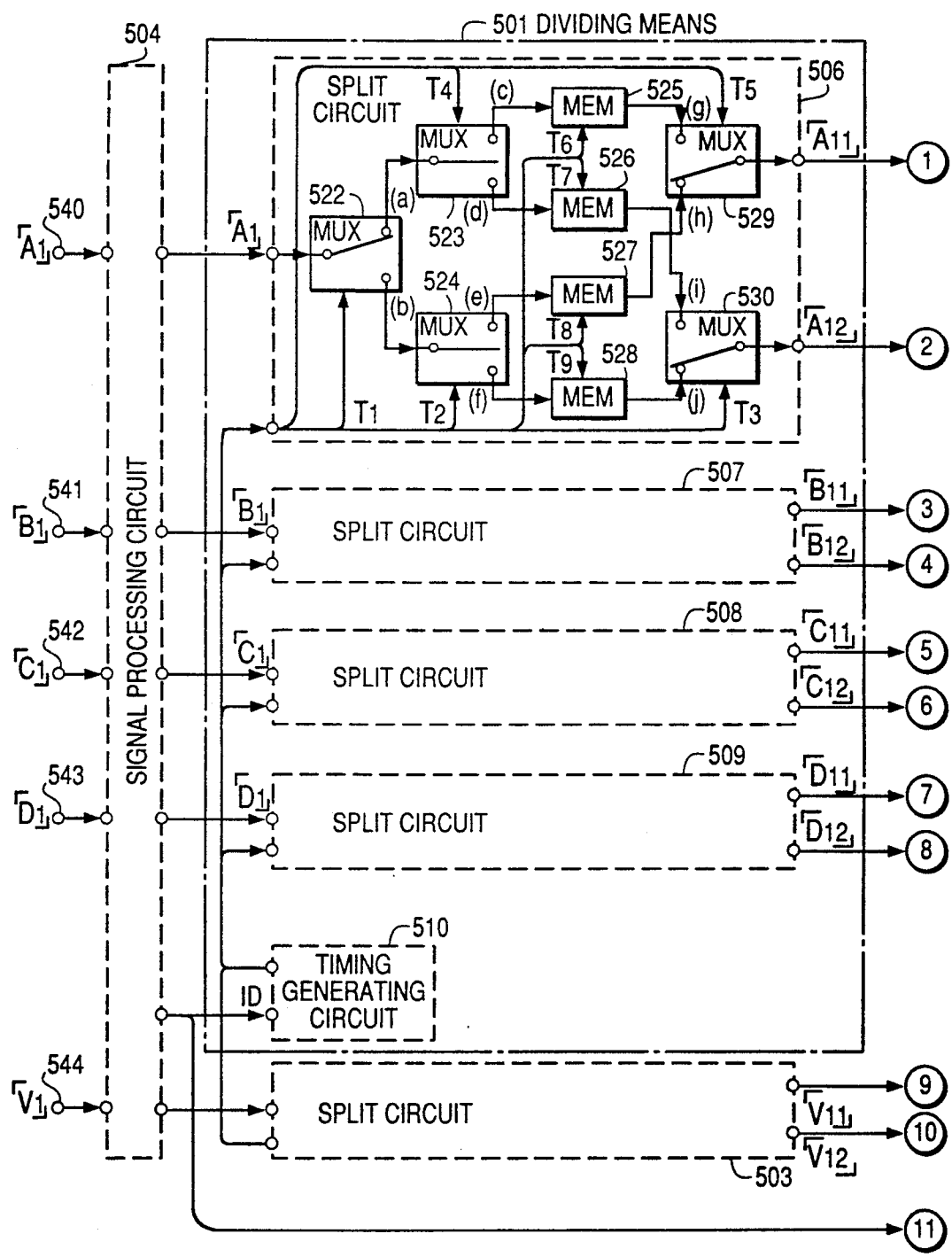
FIGS. 5A and 5B together are a block diagram of the recording apparatus of the present invention.
Figure 5B:
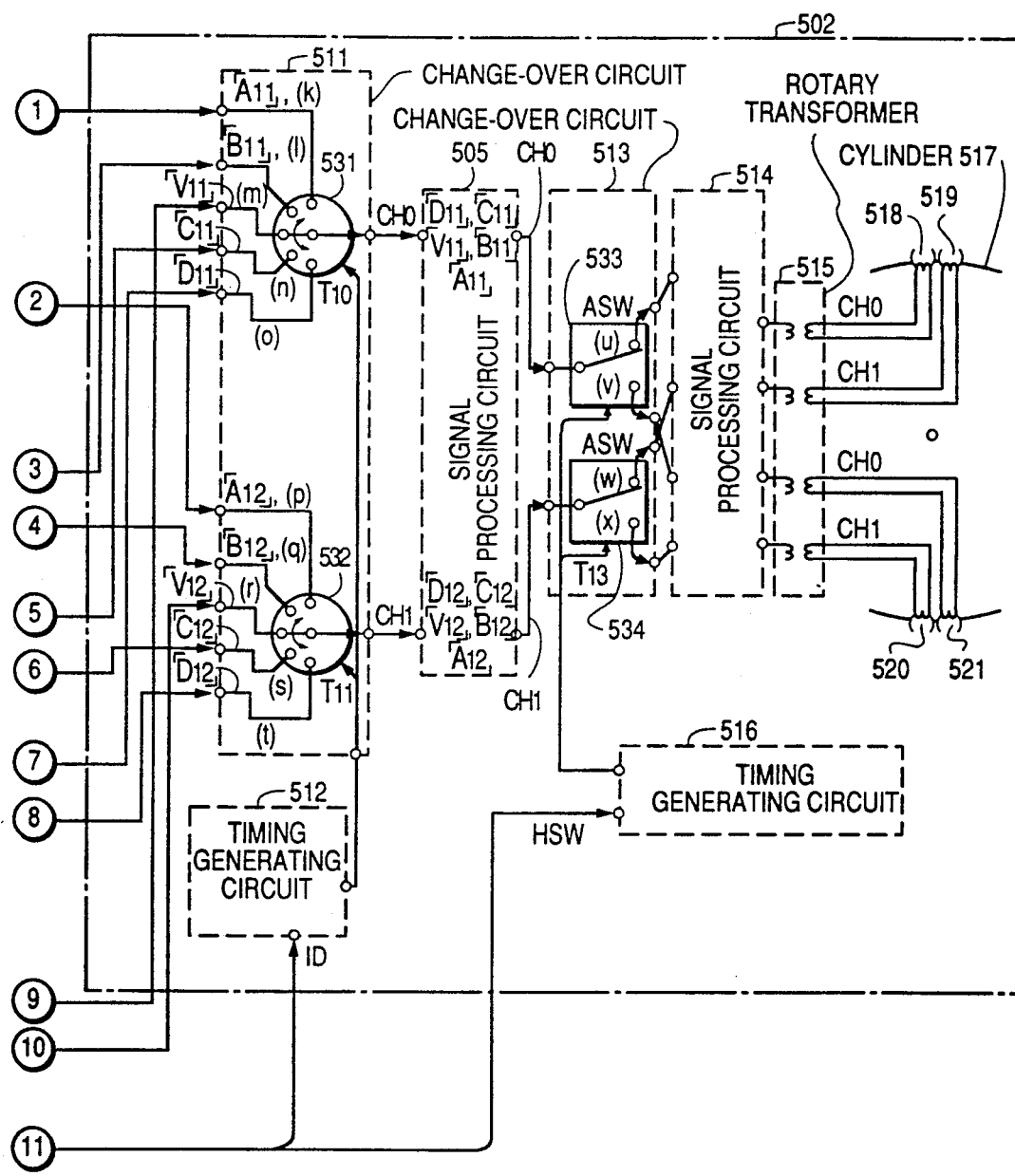

FIGS. 5A-5B together are a block diagram of the magnetic recording apparatus of the present invention.

Referring to FIGS. 5A-5B, reference numeral 501 is a means for dividing the data of the editing unit into a plurality of data; reference numeral 502 is a means for allocating each data divided to the partial data tracks so as to record them on the recording medium. Reference numerals 504, 505, and 514 are circuits for processing various types of signals; reference numerals 503, 506, 507, 508, and 509 are split circuits; reference numerals 510, 512, and 516 are timing generating circuits; reference numerals 511 and 513 are change-over circuits; reference numeral 515 is a rotary transformer; reference numeral 517 is a cylinder; reference numerals 518; 519, and 520; 521 are pairs of heads; reference numerals 522 through 524 and reference numerals 529 through 532 are multiplexers (hereinafter referred to as MUX); reference numerals 525 through 528 are memories (hereinafter referred to as MEM); reference numerals 533 and 534 are analog switches (hereinafter referred to as ASW), reference numerals 540 through 544 are input terminals.

Although the data of the editing units of the audio signals of the four channels are inputted continuously in the time series order in the "A1", "A2", "A3", ..., the "B1", "B2", "B3", ..., the "C1", "C2", "C3", ..., the "D1", "D2", "D3", ..., the "A1", "B1", "C1", "D1" to be inputted at first will be described so as to shorten the description here. Also, by the repetition of the operation to be described hereinafter, it is possible to process the signals of all the data.

The apparatus of the present embodiment is composed of a means 501 for dividing the data (audio signals of four channels) "A1", "B1", "C1", "D1" of the four editing units inputted through the signal processing circuit 504 for correcting the errors, and so on respectively into two "A11", "A12", "B11" through "D11", "D12", and a means 502 for allocating them into a plurality of partial data tracks adjacent among the data tracks so as to record them on the magnetic recording medium.

The operation thereof will be described hereinafter.

The four editing units of data "A1", "B1" through "D1" inputted from the input terminals 540, 541, 542, and 543 are inputted respectively into the split circuits 506 through 509 through the signal processing circuit 508. Each of the inputted data "A1", "B1" through "D1" are divided into the data of the "A11, A12", the "B11, B12" through "D11, D12" by the split circuits 506 through 509 with control signals to be obtained by the timing generating circuit 510 and are outputted into the change-over circuit 511.

Also, the "V1" of the editing unit data of the video signals inputted from the input terminal 544 is inputted into the split circuit 503 through the signal processing circuit 504. In the split circuit 503, the inputted data "V1" is divided to output the "V11", "V12" as the output data.

In the change-over circuit 511, the divided data "A11", "A12", "B11" through "D11", "D12" and "V11", "V12" are rearranged into the "A11", "B11", "V11", "C11", "D11" and "A12", "B12", "V12", "C12", "D12" in the time series order by the control signals to be obtained by the timing generating circuit 512 so as to output them respectively as the signals of CH0 and CH1. The output signals CH0, CH1 outputted from the change-over circuit 511 are inputted into the change-over circuit 513 through the signal processing circuit 505 for effecting the digital/analog conversion and so on.

The change-over circuit 513 is provided to record the signals CH0 and CH1 on the recording medium bound on the cylinder 517 by the use of the pair of heads 518, 521 and the pair heads 519 and 520 mounted 180 degrees apart in space on the cylinder 517. In the change-over circuit 513, the signals CH0 and CH1 are outputted with the control signals to be obtained by the timing generating circuit 516 with the switching operation being effected after a certain period into the pair of heads 518 and 519 and the pair of heads 521 and 520. Each of four output signals outputted by the change-over circuit 513 is sent to each head 518, 519, 520, and 521 through a signal processing circuit 514 and a rotary transfer 515.

Also, the respective timing generating circuits 510, 512, and 516 are adapted to output a control signal in accordance with an identifying signal (hereinafter referred as to ID signal) showing the type of the data to be outputted from the signal processing circuit 504 and the head switch (HSW).

Figure 6:
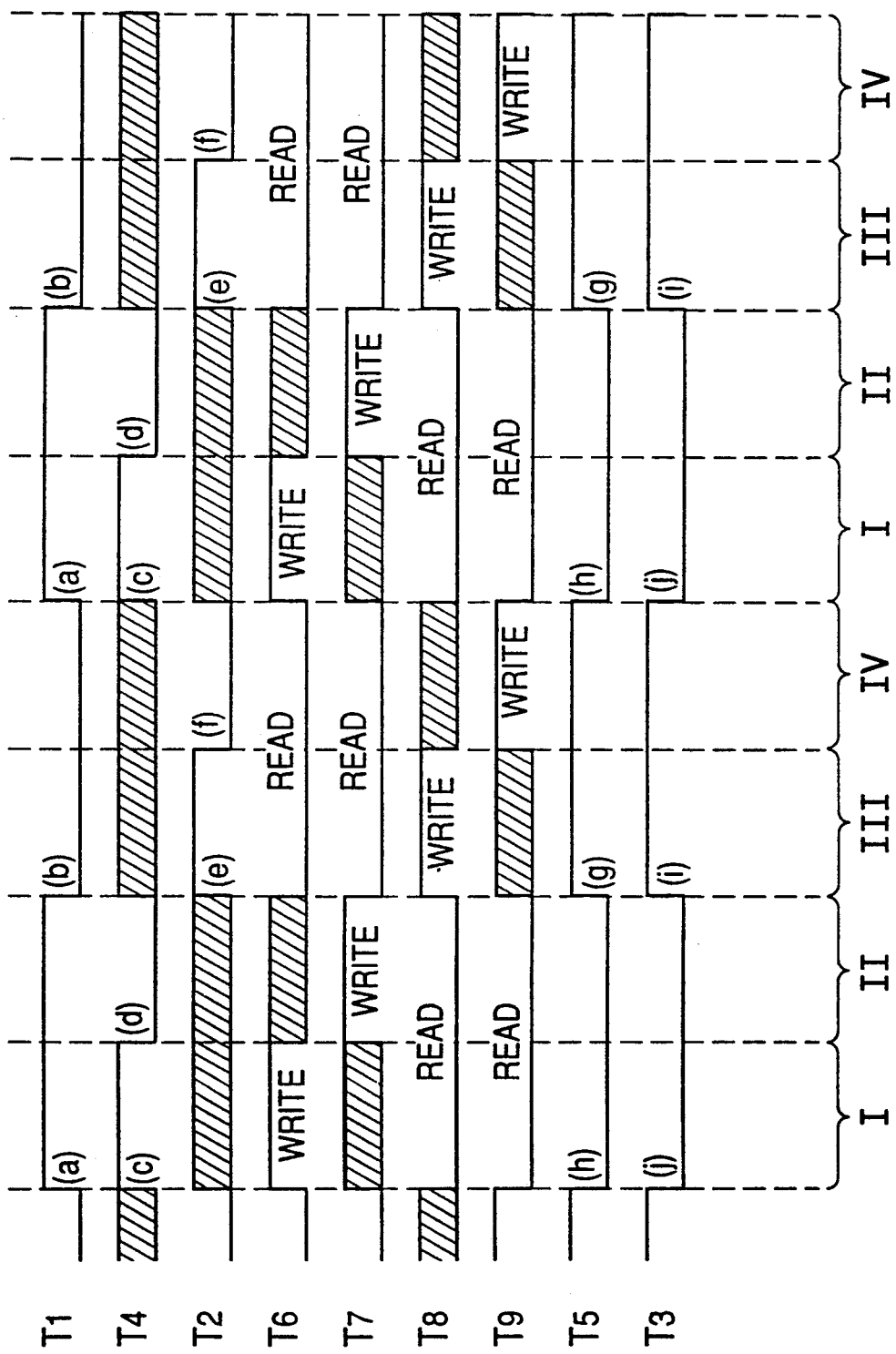
FIG. 6 is a timing charte of the control signal to be outputted from a timing generating circuit 510 shown in FIG. 5A.

FIG. 6 shows a control signal to be outputted from a timing generating circuit 510 in FIGS. 5A–5B. FIG. 6 shows a digital control signal of high or low, with the oblique line portions showing that the signal may be high or low.

Table 1 shows the operation modes of the MUX 522, 523, 524, 529, and 530 which are used in the split circuit 506 in FIGS. 5A–5B. Namely, when the control signals to be inputted is high, the respective MUXs are switched onto the terminal side of the (a), (c), (e), (g), (i), when the control signal is low, the respective MUXs are switched onto the terminal side of the (b), (d), (f), (h), (j).

TABLE 1

| Input | MUX 522 | MUX 523 | MUX 524 | MUX 529 | MUX 530 |
| --- | --- | --- | --- | --- | --- |
| High | (a) | (c) | (e) | (g) | (i) |
| Low | (b) | (d) | (f) | (h) | (j) |

Table 2 shows the operation modes of the MEM525 through 528 which are used in the split circuit 506 in FIGS. 5A–5B. Namely, when the control signal to be inputted is high, each MEM becomes a storing (write) mode, and when it becomes low, each MEM becomes a reading (read) mode.

Figure 7:
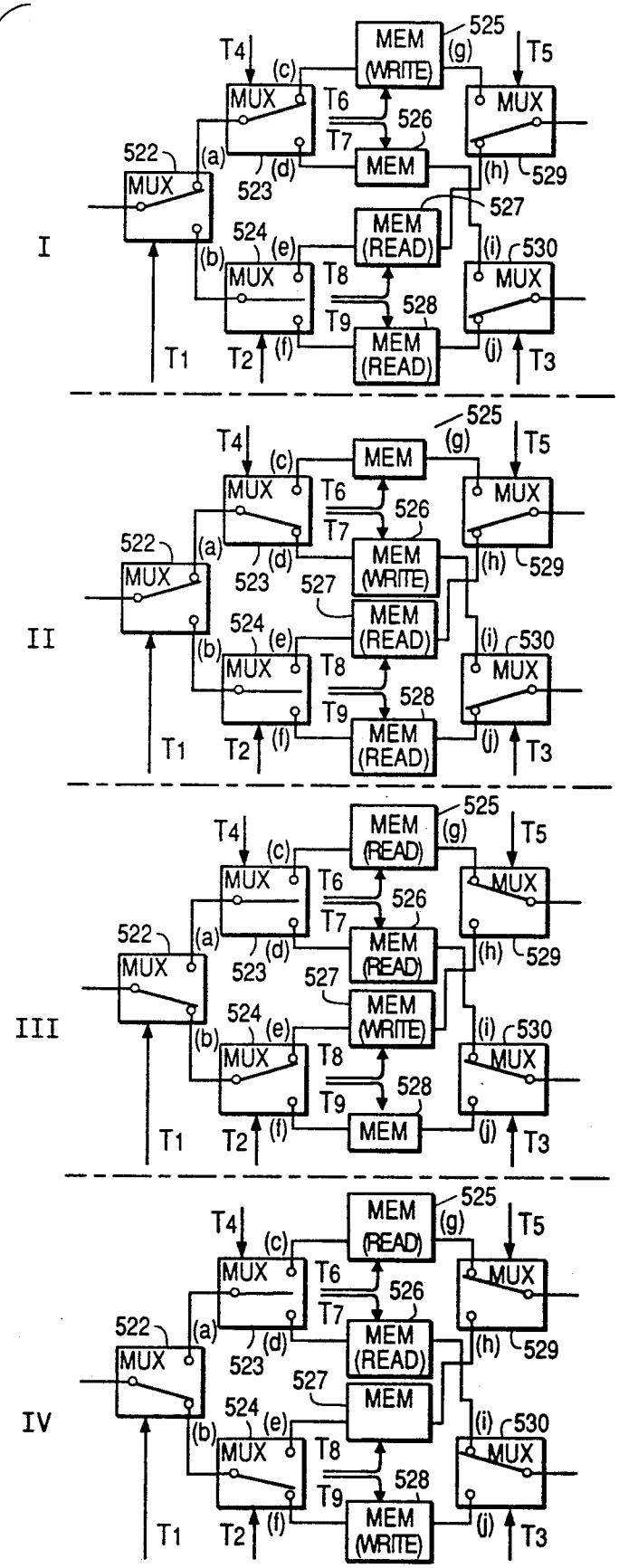
FIG. 7 is a block diagram showing the operating condition of a split circuit 506 of FIG. 5 in the periods of I, II, III, IV shown in FIG. 6.

FIG. 7 shows the condition of the operations of the respective MEM 525 through 528 and the MUX 522, 523, 524, 529, and 530 by the control signals T1 through T9 in the periods of I, II, III, IV shown in FIG. 6.

TABLE 2

| T6 through T9 | MEM 525 through 528 |
| --- | --- |
| High | storing mode |
| Low | reading mode |

Namely, when the MEM 525 and 526 are in the storing condition so as to continuously effect the signal processing operation, the MEM 527 and 528 are in the reading condition, and also, when the MEM 525 and 526 are in the reading condition, the MEM 527 and 528 are controlled to become the storing condition.

The time series former half portion of one editing unit data "A1" of the inputted audio signal is controlled to be stored into the MEM 525 and MEM 527, the time series latter half portion is controlled to be stored into the MEM 526 and MEM 528. Thus, it is found out from FIG. 10 that the inputted data "A1" of one editing unit is divided into the data of the "A11" and "A12" by the split circuit 506 according to the control signal to be obtained by the timing generating circuit 510, and is outputted into the change-over circuit 511.

The split circuits 507, 508, and 509 are also composed of MUX, MEM and so on as in the split circuit 506 to effect the similar operations. Namely, the data "B1", "C1", "D1" of the respective editing units inputted as in the split circuit 506 shown in FIG. 7 are divided into the data of the "B11" "B12", "C11" "C12", "D11" "12" by the split circuits 507, 508, 509 in accordance with the control signal to be obtained by the timing generating circuit 510, and are outputted into the change-over circuit 511.

Table 3 shows the operation modes of the MUX 531 and MEM 532 in the change-over circuit 511 of FIG. 5. Namely, in the MUX 531 and MUX 532, the respective terminals of the (k), (p) are adapted to be selected when the control signals T10 and T11 to be inputted are 0, the respective terminals of the (l), (q) are adapted to be selected when the control signals to be inputted are one, the respective terminals of the (m), (r) are adapted to be selected when they are two, the respective terminals of the (n), (s) are adapted to be selected when they are three, the respective terminals of the (o), (t) are selected when they are four.

TABLE 3

| Control Signal | MUX 531 | MUX 532 |
| --- | --- | --- |
| 0 | (k) | (p) |

TABLE 3-continued

| Control Signal | MUX 531 | MUX 532 |
| --- | --- | --- |
| 1 | (l) | (q) |
| 2 | (m) | (r) |
| 3 | (n) | (s) |
| 4 | (o) | (t) |

Figure 8:
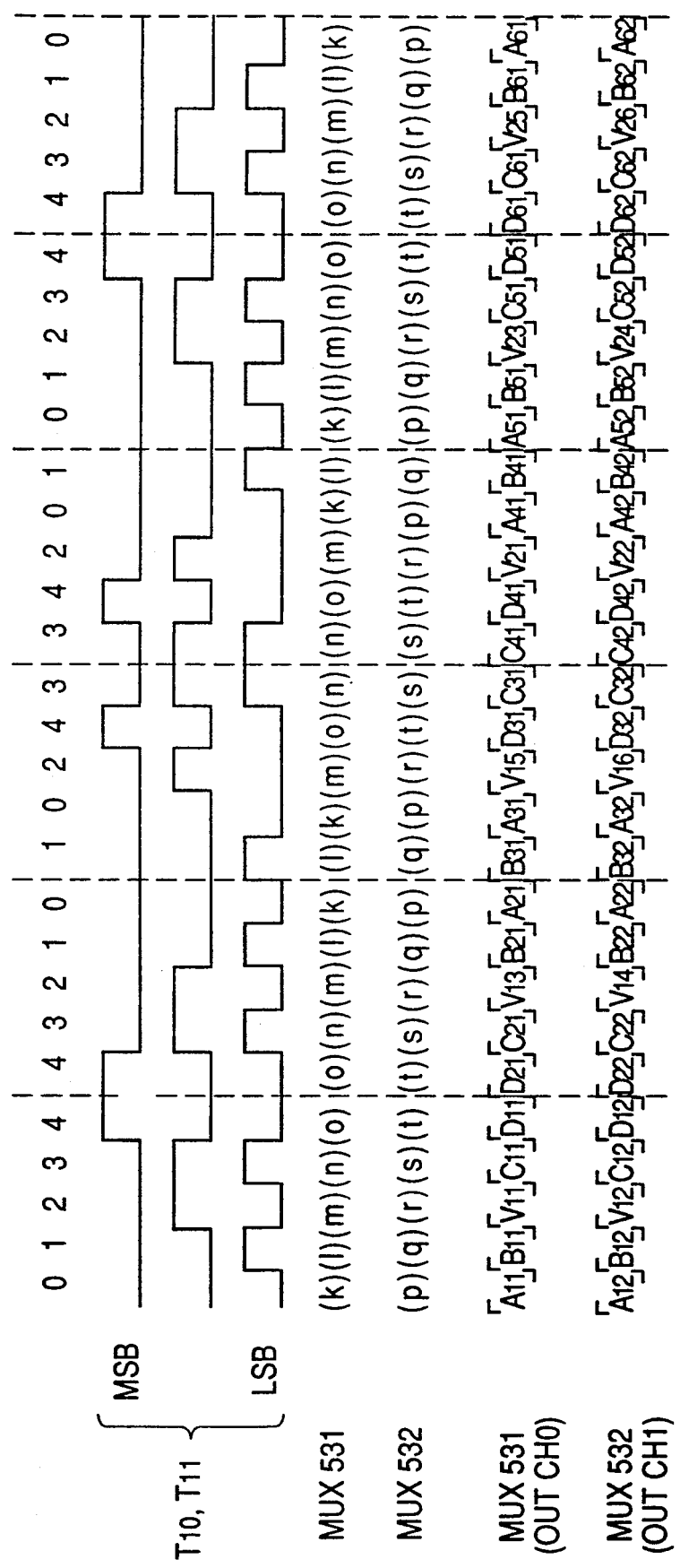
FIG. 8 is a timing chart showing the switching timings between the MUX531 and the MUX532 by the control signals to be outputted from the timing generating circuit 512 in FIG. 5.

FIG. 8 shows the change-over operation of the MUX 531 and MUX 532 by the control signals T10, T11 and the control signals T10 and T11 to be obtained by the timing generating circuit 512 of FIG. 6, and the output signals of the MUX 531 and the MUX 532 to be obtained by the change-over operation. Namely, the data divided by the change-over circuit 511 is arranged in the time series order in accordance with the control signals T10 and T11 to be obtained by the timing generating circuit 512 and are outputted respectively as the signals CH0 and CH1.

Table 4 shows the operation modes of the ASW 533 and ASW 534 of the change-over circuit 513 of FIG. 5. In the ASW 533 and ASW 534, when the control signal to be inputted is high, the terminals of the (u) and (w) are selected respectively, and when the control signal to be inputted is low, the terminals of the (v) and (x) are selected respectively.

TABLE 4

|  | ASW 533 | ASW 534 |
| --- | --- | --- |
| High | (u) | (w) |
| Low | (v) | (x) |

Figure 9:
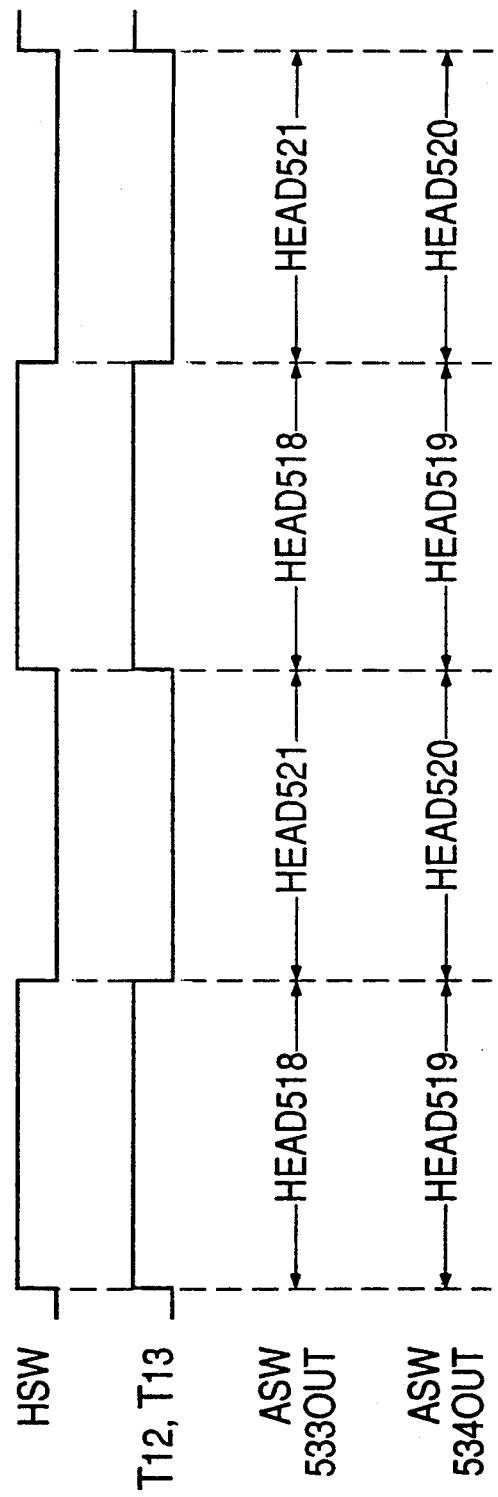
FIG. 9 is a timing chart showing the switching timings between the ASW533 and the ASW534 by the control signals to be outputted from the timing generating circuit 516 shown in FIG. 5B.

FIG. 9 shows how the ASW 533 and the ASW 534 are changed over by the control signals T12 and T13 and the control signals T12 and T13 to be obtained by the timing generating circuit 516 of FIG. 5. In the change-over circuit 513, the signals CH0 and CH1 are switched into the pair of heads 518 and 519 and the pair of heads 521 and 520 for each of the constant periods in accordance with the control signals T12 and T13 to be obtained by the timing generating circuit 516, and may be outputted. The signals outputted from the change-over circuit 513 are fed respectively into the heads 518, 519, 520, and 521 on the cylinder 517 through the signal processing circuit 514 for controlling the gain, the rotary transformer 515, and are recorded on the magnetic recording medium (not shown) by each head.

Even when the editing operation is effected with the track being shifted from the track pattern already recorded on the recording medium because of the reasons of the linearity shifts of the tracks and the head height shifts, further the tracking shifts during the reproducing operation, and so on due to the mechanical precision problem as described in detail hereinabove, the deterioration of the reproduction signals at the edition points is to be improve.d as compared with the conventional recording method.

What is claimed is:
1. A method of recording comprising the steps of:
dividing data of each of a plurality of frames including video signals and a plurality of channels of audio signals of signals to be disposed among a plurality of the same source signals into a plurality of divided data independent from other data to be recorded on a recording medium;
dividing each of a plurality of tracks provided on the recording medium into a plurality of sectors along the longitudinal direction thereof, onto which the divided data are separately and optionally recorded so as to be subsequently changed by other divided data during the editing of data; and
recording each of the divided data onto each of the sectors in such a manner that each of the divided data relating to the same kind of source signals as arranged in succession within at least more than two of the sectors of tracks which are positioned adjacent to each other in the direction of moving the recording medium so as to form an editing data unit consisting of the same kind of source signals which is adapted to be scanned by at least more than two heads at the same time during the editing of data.

2. A method of recording comprising the steps of:
dividing data of each of a plurality of frames including video signals and a plurality of channels of audio signals at each of certain intervals of time into a plurality of divided data independent from other data to be recorded on a recording medium;
dividing each of a plurality tracks provided on the recording medium into a plurality of sectors along the longitudinal direction thereof, onto which the divided data are separately and optionally recorded so as to be subsequently changed by other divided data during the editing of data; and
recording each of the divided data onto each of the sectors in such a manner that each of the divided data is arranged in succession within at least more than two of the sectors of tracks which are positioned adjacent to each other in the direction of moving the recoridng medium so as to form an editing data unit which is adapted to be scanned by at least more than two heads at the same time during the editing of data, and each of the editing data units of one divided data is arranged at the position next to the editing data unit of the other divided data to be disposed among a plurality of source signals different from the source signals related to the one divided data in the direction of moving the recording medium so that at least more than two heads does not scan in succession more than two of the editing data units of the same divided data during the editing of data.

* * * * *

UNITED STATES PATENT AND TRADEMARK OFFICE
CERTIFICATE OF CORRECTION

PATENT NO. : 5,150,262

DATED : September 22, 1992

INVENTOR(S) : Nobuo HOSOKAWA ET AL.

It is certified that error appears in the above-identified patent and that said Letters Patent is hereby corrected as shown below:

```
On the title page, items:   "[22] Filed:  June 11, 1990" to
                          --[22] PCT Filed:  October 13, 1989
                            [86] PCT No.:  PCT/JP89/01058
                                 § 371 Date:  June 11, 1990
                                 § 102(e) Date:  June 11, 1990
                            [87] PCT Pub. No.:  WO90/04251
                                 PCT Pub. Date:  April 19, 1990--.
```

Signed and Sealed this

Thirtieth Day of November, 1993

*Attest:*

BRUCE LEHMAN

*Attesting Officer*   *Commissioner of Patents and Trademarks*